US005086082A

United States Patent [19]

Stone

[11] Patent Number: 5,086,082

[45] Date of Patent: Feb. 4, 1992

[54] IGNITION RESISTANT POLYURETHANE FOAMS WITH MELAMINE

[75] Inventor: Herman Stone, Hazleton, Pa.

[73] Assignee: PMC, Inc., Sun Valley, Calif.

[21] Appl. No.: 413,271

[22] Filed: Sep. 27, 1989

[51] Int. Cl.$^5$ .......................... C08G 68/14; C08J 9/00

[52] U.S. Cl. ...................................... 521/107; 521/94; 521/110; 521/128; 521/136; 521/164; 521/166; 521/168; 521/906

[58] Field of Search ................. 521/107, 94, 164, 906, 521/166, 168, 190, 128, 136, 110

[56] References Cited

U.S. PATENT DOCUMENTS

| | | | |
|---|---|---|---|
| 4,745,133 | 5/1988 | Grinbergs et al. | 521/128 |
| 4,757,093 | 7/1988 | Ricciardi et al. | 521/107 |
| 4,810,729 | 3/1989 | Davis et al. | 521/94 |
| 4,826,884 | 5/1989 | Grace et al. | 521/128 |
| 4,849,459 | 7/1989 | Grace et al. | 521/110 |
| 4,892,893 | 1/1990 | Grace | 521/128 |

OTHER PUBLICATIONS

Grace et al. (BASF Corporation), 12th Int'l Conf. on Fire Safety, Jan. 12, 1987, pp. 19–31.

*Primary Examiner*—John Kight, III
*Assistant Examiner*—Duc Truong
*Attorney, Agent, or Firm*—Davis Hoxie Faithfull & Hapgood

[57] ABSTRACT

Improved ignition resistant, flexible, open-celled polyurethane foams are described. The foams are formed in situ from the reaction, in the presence of a catalyst, of an isocyanate, one or more blowing agents including water, a foam stabilizer, a polyether polyol, melamine, and a standard flame retardant additive. Preferred standard flame retardants are halogenated phosphorus esters and a blend of about 80 to 85% pentabromodiphenyl oxide in an aromatic phosphate plasticizer. The melamine is present in the foam formulations in an amount of from 30 to 40 parts by weight per 100 parts by weight of polyol. The standard flame retardant is present in an amount of from 15 to 25 parts by weight per 100 parts by weight of polyol. The compositions of the invention are particularly suitable for use in furniture, bedding, and carpet padding.

10 Claims, No Drawings

IGNITION RESISTANT POLYURETHANE FOAMS WITH MELAMINE

BACKGROUND OF THE INVENTION

1. Field of the Invention

This invention relates to flexible, open-celled, free-rise polyurethane ("PU") foams made by molding or by continuous casting methods. When formulated in accordance with the present invention, the PU foams possess enhanced flame retardant properties. Such ignition resistant foams are particularly suitable for use in furniture, bedding, and carpet padding.

2. Description of Related Art

Flexible PU foams, of both the conventional and high resilient types, are produced from formulations typically containing an isocyanate reactant, one or more blowing agents including water, a foam stabilizer, catalysts, and polyether polyols. High resilient ("HR") foams are those which exhibit a rapid recovery from extreme compression. As compared with conventional foams, HR foams exhibit a higher resilience (55% to 65% for HR, compared with 40% to 55% for conventional) and a higher modulus (2.2 to 2.7 for HR, compared with 1.8 to 2.3 for conventional), where the modulus is defined as the ratio of the 65% Indentation Force Deflection ("IFD") measurement to the 25% IFD measurement.

PU foams are formed by the effervescent action of a gas on the product of a polymerization reaction. Specifically, isocyanate groups react with water to generate carbon dioxide gas. This gas is dispersed and, to a large extent, retained during the subsequent polymerization—which involves the reaction of additional isocyanate with hydroxyl groups of the polyols. At the time the polymerization is essentially complete, the foam gels (i.e., becomes solid) and the cells are usually broken open by the heat of reaction and the pressure of trapped gases to produce the well-known open cell structure of flexible PU foams.

Flexible PU foams can readily be ignited by an open flame ignition source. It is therefore desirable to identify materials which, when added to the foam formulation, will increase ignition resistance without deleteriously affecting other critical properties of the foam.

The use of melamine as a fire retardant additive for various polymers has been known for many years. In PU foams, the addition of melamine in intermediate to large amounts, i.e., approximately 20 to 200 phr (parts by weight per hundred parts of polyol), has been demonstrated to be useful in enhancing the ignition resistance of both flexible and rigid foams.

In contrast to these so-called "melamine foams," other PU foam formulations traditionally have achieved satisfactory flame resistance ratings by incorporating standard halogenated phosphorus ester flame retardant additives, without addition of melamine.

U.S. Pat. No. 4,757,093 discloses the substitution of small amounts (approximately 1 to 3 phr) of melamine for a portion of the halogenated phosphorus ester flame retardant in flexible foam formulations, with no diminution in the degree of ignition resistance. The patent teaches, however, that no benefit accrues from the addition of melamine in amounts greater than 5 phr, since the the marginal improvement in the foam's flame resistance would not justify the additional increase in cost.

The preferred halogenated phosphorus ester additives of U.S. Pat. No. 4,757,093 include tetrakis(2-chloroethyl) ethylene diphosphate, commercially available from Olin Chemical Corporation under the tradename Thermolin TM-101. The preferred esters are disclosed to be essentially interchangeable with a blend of about 80 to 85% pentabromodiphenyl oxide, a non-ester, in an aromatic phosphate plasticizer, marketed by Great Lakes Chemical Corporation under the tradename DE-60F. The patent presents burn test data indicating that the combination of either DE-60F or a preferred ester with melamine yields equivalent flame retardant performance.

In a paper presented at the 12th International Conference on Fire Safety in 1987, BASF Corporation disclosed the use in HR flexible foam formulations of a combination of an intermediate amount (approximately 10 to 25 phr) of melamine with standard flame retardant additives in amounts of approximately 3 to 12 phr. The resulting HR foams were able to pass the California Technical Bulletin No. 117 test, adopted in 1975, for resistance to a small open flame source. BASF also disclosed the use of low levels of melamine to improve smoldering resistance of HR foams after flexing.

The use of the melamine/standard flame retardant combination, as disclosed by BASF, appears to have been restricted to HR foam technology. Such a restriction is understandable, because one effect of the additive combination is to depress the already low melting point of HR foams, to produce a melt which is difficult to ignite. The use of such additives in conventional flexible foams, which typically have higher melting points, would have been expected to be unavailing.

In addition to the fact that the us of the additive combination has been limited to HR foam technology, the resulting foams also have been demonstrated to meet only the least rigorous burn standards, e.g., California 117. The need continues for foams capable of passing the more demanding flammability tests, such as Underwriters Laboratories UL-94A, adopted in January 1980, and, especially, British Standard 5852 Pt.2 Source 5, adopted in March 1982.

SUMMARY OF THE INVENTION

The present invention provides new formulations for the manufacture of flame retardant flexible PU foams in general and, in particular, flame retardant conventional (non-HR) flexible PU foams. The foams of the invention meet not only California 117, but also UL-94 and BS-5852 Pt.2 Source 5 ignition resistance standards.

According to the invention, melamine and a standard flame retardant additive are combined in foam formulations in amounts not previously contemplated. Specifically, melamine is added in an amount of from about 30 to about 40 phr, and standard flame retardant is added in an amount of from about 15 to about 25 phr. The densities of the resulting foam products range from about 1.4 to about 2.4 pounds per cubic foot ("pcf").

It has been further discovered that, when added respectively in the above amounts, the combination of melamine with a blend of about 80 to 85% pentabromodiphenyl oxide in an aromatic phosphate plasticizer exhibits a surprising synergistic effect, resulting in a foam product with flame retardant ratings measurably superior to those of foam products containing the combination of melamine with a halogenated phosphorus ester.

A further benefit arising from the use of the additive combinations of the present invention is the production of lower cost foams having greater hydrolytic stability and a more desirable fine, uniform cell structure as compared with the typically coarser cell structure of HR foams. A variety of foams, covering a wide range of densities and hardness grades, can be produced with relatively minor changes in the formulations.

DETAILED DESCRIPTION OF THE INVENTION

The invention relates to flexible, ignition resistant PU foams and to a method for making such foams. The term "ignition resistant," as used in this specification, means a foam meeting the UL-94 standard or British Standard 5852 Pt.2 Source 5, or both.

Formulations of the invention incorporate melamine in an amount of from about 30 to about 40 phr. The melamine preferred is in the powder form commercially available from, e.g., Melamine Chemicals, Inc., American Cyanamide Co., and Montedison.

Standard flame retardant additives are incorporated in formulations of the invention in amounts of from about 15 to about 25 phr. Useful additives include halogenated phosphorus esters as well as a blend of about 80 to 85% pentabromodiphenyl oxide in an aromatic phosphate plasticizer. Mixtures of these additives can be employed. Typical halogenated phosphorus esters include tetrakis(2-chloroethyl) ethylene diphosphate and tris(2,3-dichloropropyl) phosphate, the latter commercially available from Akzo, Inc. under the tradename Fyrol FR-2.

Among the standard flame retardant additives of the invention, a blend of about 80 to 85% pentabromodiphenyl oxide in an aromatic phosphate plasticizer is preferred. Although tetrakis(2-chloroethyl) ethylene diphosphate (TM-101), when used without melamine, heretofore has been regarded as a better flame retardant than has a blend of about 80 to 85% pentabromodiphenyl oxide in an aromatic phosphate plasticizer, it now has been discovered that the combination of melamine and a blend of about 80 to 85% pentabromodiphenyl oxide in an aromatic phosphate plasticizer, in the above-specified quantities, is superior to the combination of melamine and tetrakis(2-chloroethyl) ethylene diphosphate. Table 1 presents a range of effective combinations of melamine and a blend of about 80 to 85% pentabromodiphenyl oxide in an aromatic phosphate plasticizer (DE-60F), based on varying the amount of each ingredient. Also presented, for each such combination, is the lowest density at which a foam containing that combination will meet British Standard 5852 Pt.2 Source 5. Especially preferred is a combination of 35 phr melamine and 18 phr of a blend of about 80 to 85% pentabromodiphenyl oxide in an aromatic phosphate plasticizer, with a minimum foam density of 1.9 pcf.

The densities of the foams of the invention range from about 1.4 to about 2.4 pcf. In general, foams of the invention are formulated so as to minimize density and minimize the amounts of melamine and standard flame retardant additive, while still meeting British Standard 5852 Pt.2 Source 5. Foams incorporating greater amounts of melamine and standard flame retardant additive, or having higher densities, or both, also would meet BS-5852, but at higher cost and at the expense of other physical properties such as tensile strength, tear strength, and elongation.

Foams of the invention must contain less than about 2 phr of inorganic fillers, i.e., solid, nonmelting additives, including those normally used for smoke reduction. These additives, when present at greater than about 2 phr, tend to increase the melt viscosity of the foam, resulting in a foam which will melt less easily and, hence, will more readily ignite.

The air permeability measurement of the foams of the invention should fall within the range of from about 0.3 to about 3.0 cubic feet per minute ("cfm"), and preferably from about 0.5 to about 2.5 cfm. In general, the lower the air permeability measurement of the foam, the better the flame retardant performance; but the higher the air permeability, the more comfortable the cushion made from the foam. The latter consideration is especially important in furniture and bedding applications.

The conventional polyether polyol reactants useful in the invention are those known to those skilled in the art to be suitable in the production of PU foams. The polyether polyol has a molecular weight of about 2000 to about 6500, and preferably from about 2500 to about 4000, with a hydroxyl functionality of about 2 to about 8, and preferably about 2 to about 3. Suitable polyether polyols can be prepared by the addition of an excess of alkylene oxides, such as propylene oxide ("PO") and/or ethylene oxide ("EO"), to glycerine, trimethylolpropane, pentaerythritol, alphamethylglucoside, sorbitol or sucrose, for example. Most preferred are polyether polyols of glycerine, PO and EO, and those modified by copolymerization with styrene or mixtures of styrene and acrylonitrile. The latter are commonly referred to as "polymer polyols" or "graft polyols."

The isocyanate reactant used in the invention is also conventional in the art of PU foam production. Preferably, TDI (tolylene diisocyanate is employed and, as used, is one of the commercially available mixtures of the 2,4- and 2,6-isomers, ranging from about 65 to about 80% of the 2,4-isomer, and preferably about 80%. However, other polyisocyanates having on average two isocyanate groups per aromatic ring are suitable. Examples of such compounds are phenylene diisocyanate, naphthalene diisocyanate, diphenyl-4,4'-diisocyanate, xylene diisocyanate, polymeric methylene diparaphenylene isocyanate (MDI), and the like. Polyisocyanate must be added in an amount sufficient to react with all of the amines in the foam formulation. The amount of polyisocyanate normally added (i.e., the polyisocyanate "index") is about 102% to about 110%, and preferably about 106%, of the amount required to react stoichiometrically with the reactive groups in the formulation, which reactive groups comprise primarily the hydroxyl groups of the polyols and the water.

Conventional blowing agents and catalysts are also used in the present invention. Water is the preferred blowing agent, but can be supplemented by volatile organic blowing agents. Water can be present in an amount from about 2 to about 6 parts by weight per 100 parts by weight of total polyol present. Preferably, water is present in amounts of about 3 to about 5 parts per 100 parts of polyol.

Salts of organic acids or organometallic compounds are usually used to catalyze the reaction. Organic tin compounds are normally used; useful catalysts include salts of carboxylic acids such as tin (II) acetate, tin (II) octoate, tin (II) ethylhexoate, tin (II) laurate and dialkyl tin salts such as dibutyl tin diacetate, dibutyl tin dilaurate, dibutyl tin maleate and dioctyl tin diacetate. The organic metal catalyst is normally added in amounts of from about 0.05 to about 1.0 part by weight per 100 parts by weight of total polyol present. Preferably it is present in amounts of from about 0.45 to about 1.0 part. The preferred catalyst is stannous octoate.

Tertiary aliphatic amines are also conventional and are used as co-catalysts in the production of the PU foams of the invention. Useful compounds include, for example, triethylenediamine, N-ethylmorpholine, N,N,N,',N'-tetramethyl-1,3-butanediamine, bis 2-(N,N-dimethylamino) ethyl ether, diethylenetriamine, oxybis (N,N'-diethanolamine) and other compounds well known in the art. Such compounds normally are added in amounts of from about 0.1 to about 0.6 parts by weight per 100 parts by weight of total polyol present. Preferably, they are present in amounts of about 0.1 to 0.2 parts. Preferred are mixtures of diethylenetriamine and bis (2-dimethylamino) ethyl ether.

Conventional PU foam stabilizers can also be, and preferably are, included in the reaction mixture of the present invention. Useful stabilizers include those well-known to the art, e.g., polyalkylene oxide dimethyl siloxane copolymers. A preferred polysiloxane, designated Q25160, is commercially available from Dow Corning. The stabilizers are conventionally added in amounts of from about 0.7 to about 6 parts by weight per 100 parts by weight of total polyol present. Preferably they are present in amounts of from about 1 to about 2 parts.

Other ingredients which optionally can be added to the formulations of the invention include discoloration and aging inhibitors, pigments, such as carbon black, colorants, and the like.

The PU foams of the invention can be produced using conventional foam-making machinery operated in a manner known to those skilled in the art. The foams can be made either by molding or by casting processes. In the latter, reactants and additives are mixed together and deposited on a moving casting conveyor in a conventional manner where the foam rises and reaches a self-sustaining configuration, after which it can be cut and otherwise handled.

Tables 2 through 11 further illustrate the invention, but are not inclusive of the full scope of the invention. Ingredients and entries in those tables are here described:

Polyols

Voranol 3140 - a polyether polyol having a hydroxyl number of 44. It is sold by Dow Chemical Company.

9151 - a polyether polyol having a hydroxyl number of about 28. It is sold by Mobay Chemical Company.

HS-100 - a polyether polymer polyol having a hydroxyl number of about 27. It is sold by Union Carbide Corp.

Niax 16-46 - a polyether polyol having a molecular weight of about 3500. It is sold by Union Carbide Corp.

Niax E-646 - a polyether polymer polyol, containing grafted styrene acrylonitrile copolymer and homopolymer, having a hydroxyl number of about 27. It is sold by Union Carbide Corp.

Stabilizers

Q25160 - a polysiloxane, sold by Dow Corning.

Co-catalysts

C-232 - a tertiary amine catalyst comprising a blend of 3 parts of a mixture of bis (2-dimethylaminoethyl) ether (70%) and dipropylene glycol (30%) with 1 part of a mixture of diethylenetriamine (33%) and propylene glycol (67%).

Catalysts

S-50 - a tin catalyst comprising 50% stannous octoate in a phthalate plasticizer. It is sold by Cosan Chemical Co.

T-10 - a tin catalyst comprising stannous octoate diluted with an approximately equal amount of di(2-ethylhexyl) phthalate. It is sold by Air Products and Chemicals, Inc.

Additives

DE-60F - a blend of about 80 to 85% pentabromodiphenyl oxide in an aromatic phosphate plasticizer. It is sold by Great Lakes Chemical Corporation.

Melamine - melamine powder. It is sold by, e.g., Melamine Chemicals, Inc., American Cyanamide Co., and Montedison.

Thermolin TM-101 - tetrakis(2-chloroethyl) ethylene diphosphate. It is sold by Olin Chemical Corporation.

Fyrol FR-2 - tris(2,3-dichloropropyl) phosphate. It is sold by Akzo, Inc.

Black 4889 - carbon black (approximately 13%) dispersed in a polyether polyol. It is sold by Pigment Dispersions, Inc., a subsidiary of ICI Americas, Inc.

White 3153 - titanium dioxide (50%) dispersed in a polyester polyol. It is sold by Pigment Dispersions, Inc.

Firebrake ZB - zinc borate. It is sold by United States Borax & Chemical Corp.

FR 300 BA - decabromodiphenyl oxide. It is sold by Dow Chemical Co.

Firemaster 642 - a proprietary formulation, consisting of a mixture of halogenated phosphate ester and halogenated aromatic, sold by Great Lakes Chemical Corporation. Analysis of the formulation indicates that it contains approximately 6.5% phosphorus, 7% chlorine, and 42% bromine.

Properties

The units of density are pounds per cubic foot.

The IFD 4"-25% data given are Indentation Force Deflection measurements performed in accordance with ASTM D 3574-86 Test B. The units of IFD are pounds.

The units of air permeability are cubic feet (of air) per minute (as measured by Test G of ASTM Method D 3574-86).

The Underwriters Laboratories UL-94 Aged data are for foam samples aged in an oven for one week at 70° C.

Burn rating designations, according to UL criteria and in order of decreasing flame retardant performance, are "HF-1," "HF-2," and "HBF." "NC" is not a UL classification; it is an abbreviation for "noncomplying," which indicates that a sample meets none of the UL burn rating designations.

UL burn times are measured in seconds and include a 60-second initial exposure to a small flame ignition source. To be rated HF-1, a foam sample either must not burn or must self-extinguish within 2.5 seconds after withdrawal of the ignition source. Any burn time entry of 62.5 seconds or less, as presented in the tables, meets this criterion.

UL burn distances are measured in inches from the ignited edge of a longitudinal foam sample. An HF-1 rating requires a burn distance of 2.25 inches or less. Any foam sample having a burn distance greater than 2.25 inches, but which has self-extinguished before burning along its entire length, is rated HBF.

The BS-5852 flammability data are for British Standard 5852 Pt.2 Source 5; weight loss data are measured in grams. The test involves exposure of a sample, consisting of a foam covered with a standard fabric, to a burning woodcrib having an initial weight of 18 grams. To pass the test the sample must stop burning, having experienced a weight loss of no more than 60 grams—which includes the 18 grams consumed in the complete combustion of the woodcrib.

An entry of "yes" in the Flame Extinguish category indicates that a sample continued to burn and, hence, needed to be manually extinguished. In such a case, weight loss was measured at the time the fire was put out. An entry of "no" indicates a good result, i.e., that the sample self-extinguished.

Significance of Specific Tables

Table 11 shows that, where melamine and standard flame retardant additive are present in smaller amounts than those called for by the invention, the resulting foams are not sufficiently ignition resistant.

Tables 4 and 5 define the minimum proportions of melamine and a blend of about 80 to 85% pentabromodiphenyl oxide in an aromatic phosphate plasticizer required for satisfactory ignition resistance, as well as the effect of density variations on ignition resistance.

Table 6 demonstrates the deleterious effect on ignition resistance from the addition of even small amounts of inorganic filler.

Table 7 demonstrates the deleterious effect of 300 BA, a high-melting flame retardant additive, on ignition resistance of the foam.

TABLE 1

| Melamine (phr) | DE-60F (phr) | Lowest Density (pcf) |
|---|---|---|
| 40 | 20 | 1.6 |
| 40 | 18 | 1.8 |
| 40 | 15 | 1.9 |
| 35 | 18 | 1.8–1.9 |
| 35 | 15 | 2.1 |
| 30 | 20 | 1.9–2.0 |
| 30 | 18 | 2.0–2.1 |

TABLE 2

| Formulation | A | B | C | D |
|---|---|---|---|---|
| 3140 | 100 | 100 | 100 | 100 |
| Melamine | 40 | 40 | 40 | 50 |
| TDI 80/20 | 45.51 | 45.51 | 50.12 | 51.65 |
| Index | 106 | 106 | 106 | 106 |
| Q25160 | 1 | 1 | 1.2 | 1.2 |
| T-10 | 0.75 | 0.75 | 1.2 | 1 |
| Water | 3.75 | 3.75 | 4.2 | 4.35 |
| C-232/3140 1:4 | 0.75 | 0.75 | 0.75 | 0.75 |
| DE-60F | 15 | 18 | 18 | 15 |
| Density | 2.11 | 2.10 | 1.77 | 1.71 |
| IFD 4"-25% | 27.0 | 28.5 | 23.0 | 23.0 |
| Air Perm | 2.5 | 2.0 | 0.3 | 1.7 |
| UL-94 Aged | | | | |
| Burn Time | 18.8 | 17.8 | 17.8 | 17.4 |
| Burn Distance | 0.71 | 0.80 | 0.79 | 0.75 |
| Burn Rating | HF-1 | HF-1 | HF-1 | HF-1 |

| Formulation | E | F | G | H | I |
|---|---|---|---|---|---|
| 3140 | 100 | 100 | 100 | 100 | 100 |
| Melamine | 40 | 40 | 40 | 35 | 35 |
| TDI 80/20 | 53.18 | 49 | 49 | 49 | 47.98 |
| Index | 106 | 106 | 106 | 106 | 106 |
| Q25160 | 1.2 | 1.2 | 1.2 | 1.2 | 1.2 |
| T-10 | 1 | 0.9 | 0.9 | 0.9 | 1 |
| Water | 4.5 | 4.1 | 4.1 | 4.1 | 4 |
| C-232/3140 1:4 | 0.5 | 0.5 | 0.5 | 0.5 | 0.5 |
| DE-60F | 18 | 18 | 15 | 15 | 18 |

TABLE 2-continued

| | | | | | |
|---|---|---|---|---|---|
| Density | 1.74 | 1.96 | 1.91 | 1.83 | 1.90 |
| IFD 4"-25% | 25.0 | 29.0 | 29.0 | 24.5 | 28.0 |
| Air Perm | 0.8 | 1.4 | 1.1 | 1.7 | 1.4 |
| UL-94 Aged | | | | | |
| Burn Time | 17.0 | 20.2 | 26.0 | 18.6 | 17.4 |
| Burn Distance | 0.70 | 0.83 | 0.94 | 0.76 | 0.74 |
| Burn Rating | HF-1 | HF-1 | HF-1 | HF-1 | HF-1 |

TABLE 3

| Formulation | A | B | C | D |
|---|---|---|---|---|
| 3140 | 100 | 100 | 100 | 100 |
| Melamine | 35 | 35 | 35 | 35 |
| TDI 80/20 | 47.98 | 52.08 | 52.08 | 43.88 |
| Index | 106 | 106 | 106 | 106 |
| Q25160 | 1.2 | 1.2 | 1.2 | 1.2 |
| T-10 | 1 | 1 | 1 | 0.75 |
| Water | 4 | 4.4 | 4.4 | 3.6 |
| C-232/3140 1:4 | 0.5 | 0.5 | 0.5 | 0.75 |
| FR-2 | 18 | — | — | — |
| TM-101 | — | — | — | — |
| DE-60F | — | 18 | 15 | 15 |
| Black 4889 | — | — | — | — |
| White 3153 | — | — | — | — |
| Density | 1.95 | 1.75 | 1.69 | 2.06 |
| IFD 4"-25% | 33.0 | 28.0 | 30.0 | 32.0 |
| Air Perm | 0.7 | 1.4 | 1.7 | 2.5 |
| UL-94 Aged | | | | |
| Burn Time | 18.6 | 16.2 | 16.6 | 20.0 |
| Burn Distance | 0.85 | 0.73 | 0.74 | 0.76 |
| Burn Rating | HF-1 | HF-1 | HF-1 | HF-1 |

| Formulation | E | F | G | H |
|---|---|---|---|---|
| 3140 | 100 | 100 | 100 | 100 |
| Melamine | 35 | 35 | 30 | 30 |
| TDI 80/20 | 43.88 | 43.88 | 43.88 | 43.88 |
| Index | 106 | 106 | 106 | 106 |
| Q25160 | 1.2 | 1.2 | 1.2 | 1.2 |
| T-10 | 0.75 | 0.75 | 0.75 | 0.75 |
| Water | 3.6 | 3.6 | 3.6 | 3.6 |
| C-232/3140 1:4 | 0.75 | 0.75 | 0.75 | 0.75 |
| FR-2 | — | — | — | — |
| TM-101 | — | — | 12 | — |
| DE-60F | 18 | 18 | — | 18 |
| Black 4889 | — | — | — | 1.3 |
| White 3153 | — | — | — | 5 |
| Density | 2.07 | 2.18 | 1.98 | 2.11 |
| I FD 4"-25% | 31.5 | 27.0 | 30.0 | 31.5 |
| Air Perm | 2.6 | 2.4 | 1.8 | 1.7 |
| UL-94 Aged | | | | |
| Burn Time | 19.0 | 18.6 | 37.2 | 18.4 |
| Burn Distance | 0.81 | 0.77 | 1.28 | 0.77 |
| Burn Rating | HF-1 | HF-1 | HF-1 | HF-1 |

TABLE 4

| Formulation | A | B | C | D |
|---|---|---|---|---|
| 3140 | 100 | 100 | 100 | 100 |
| Melamine | 40 | 40 | 40 | 40 |
| TDI 80/20 | 53.18 | 53.18 | 53.18 | 58.3 |
| Index | 106 | 106 | 106 | 106 |
| Q25160 | 1.2 | 1.2 | 1.2 | 1.2 |
| T-10 | 1 | 0.825 | 0.825 | 0.9 |
| Water | 4.5 | 4.5 | 4.5 | 5 |
| C-232/3140 1:4 | 0.5 | 0.5 | 0.5 | 0.5 |
| DE-60F | 18 | 18 | 20 | 20 |
| Density | 1.69 | 1.76 | 1.80 | 1.63 |
| IFD 4"-25% | 25.0 | 29.5 | 28.5 | 31.0 |
| Air Perm | 0.5 | 2.2 | 2.3 | 1.2 |
| UL-94 Aged | | | | |
| Burn Time | 28.8 | 37.2 | 35.2 | 31.2 |
| Burn Distance | 1.25 | 1.51 | 1.51 | 1.45 |
| Burn Rating | HF-1 | HF-1 | HF-1 | HF-1 |

| Formulation | E | F | G | H | I |
|---|---|---|---|---|---|
| 3140 | 100 | 100 | 100 | 100 | 100 |
| Melamine | 40 | 40 | 40 | 35 | 35 |
| TDI 80/20 | 58.3 | 64.45 | 64.45 | 58.3 | 52.15 |

TABLE 4-continued

| | | | | | |
|---|---|---|---|---|---|
| Index | 106 | 106 | 106 | 106 | 106 |
| Q25160 | 1.2 | 1.2 | 1.2 | 1.2 | 1.2 |
| T-10 | 0.825 | 0.9 | 0.9 | 0.825 | 0.825 |
| Water | 5 | 5.6 | 5.6 | 5 | 4.4 |
| C-232/3140 1:4 | 0.5 | 0.5 | 0.5 | 0.5 | 0.5 |
| DE-60F | 18 | 18 | 20 | 18 | 18 |
| Density | 1.58 | 1.40 | 1.40 | 1.54 | 1.64 |
| IFD 4"-25% | 30.5 | 27.0 | 26.0 | 27.0 | 27.0 |
| Air Perm | 1.7 | 1.9 | 2.1 | 1.3 | 1.5 |
| UL-9 Aged | | | | | |
| Burn Time | 38.0 | 34.6 | 35.4 | 35.8 | 33.2 |
| Burn Distance | 1.91 | 1.64 | 1.71 | 1.53 | 1.44 |
| Burn Rating | HF-1 | HF-1 | HF-1 | HF-1 | HF-1 |

TABLE 5

| Formulation | A | B | C | D |
|---|---|---|---|---|
| 3140 | 100 | 100 | 100 | 100 |
| Melamine | 30 | 30 | 30 | 30 |
| TDI 80/20 | 48.05 | 48.05 | 42.9 | 42.9 |
| Index | 106 | 106 | 106 | 106 |
| Q25160 | 1.2 | 1.2 | 1.2 | 1.2 |
| T-10 | 0.775 | 0.775 | 0.8 | 0.85 |
| Water | 4 | 4 | 3.5 | 3.5 |
| C-232/3140 1:4 | 0.5 | 0.5 | 0.5 | 0.5 |
| DE-60F | 18 | 20 | 20 | 18 |
| Density | 1.85 | 1.85 | 2.09 | 2.14 |
| IFD 4"-25% | 29.5 | 29.5 | 29.0 | 29.0 |
| Air Perm | 2.6 | 2.5 | 2.0 | 0.8 |
| UL 94 Aged | | | | |
| Burn Time | 69.6 | 34.0 | 35.2 | 37.0 |
| Burn Distance | 2.81 | 1.29 | 1.31 | 1.29 |
| Burn Rating | HBF | HF-1 | HF-1 | HF-1 |

TABLE 6

| Formulation | A | B | C | D |
|---|---|---|---|---|
| 3140 | 80 | 80 | 80 | 80 |
| HS-100 | 20 | 20 | 20 | 20 |
| Melamine | 35 | 35 | 35 | 40 |
| TDI 80/20 | 49.08 | 44 | 44 | 49.08 |
| Index | 106 | 106 | 106 | 106 |
| Q25160 | 1.2 | 1.2 | 1.2 | 1.2 |
| S-50 | 0.825 | 0.8 | 0.8 | 0.825 |
| Water | 4.1 | 3.6 | 3.6 | 4.1 |
| C-232/3140 1:4 | 0.5 | 0.5 | 0.5 | 0.5 |
| DE-60F | 18 | 18 | 18 | 18 |
| ZB | — | — | 2 | — |
| Density | 1.78 | 2.04 | 2.06 | 1.81 |
| IFD 4"-25% | 31 | 38.5 | 33.5 | 37 |
| Air Perm | 2 | 1 | 2.2 | 1 |
| UL-94 Aged Burn Rating | HF-1 | HF-1 | NC | HF-1 |
| BS-5852 Source 5 Weight Loss | 53 | 28 | 74 | 30 |

| Formulation | E | F | G | H |
|---|---|---|---|---|
| 3140 | 80 | 80 | 80 | 80 |
| HS-100 | 20 | 20 | 20 | 20 |
| Melamine | 40 | 40 | 40 | 40 |
| TDI 80/20 | 45.5 | 45.5 | 53.18 | 53.18 |
| Index | 106 | 106 | 106 | 106 |
| Q25160 | 1.2 | 1.2 | 1.2 | 1.2 |
| S-50 | 0.75 | 0.75 | 0.8 | 0.8 |
| Water | 3.75 | 3.75 | 4.5 | 4.5 |
| C-232/3140 1:4 | 0.5 | 0.5 | 0.5 | 0.5 |
| DE-60F | 18 | 18 | 18 | 18 |
| ZB | — | 2 | 2 | — |
| Density | 1.98 | 2.11 | 1.66 | 1.66 |
| IFD 4"-25% | 38.5 | 39.5 | 34.5 | 30.5 |
| Air Perm | 1.4 | 1.2 | 1.6 | 1.8 |
| UL-94 Aged Burn Rating | HF-1 | HF-1 | HF-1 | HF-1 |
| BS-5852 Source 5 Weight Loss | 37 | 37 | — | 47 |

TABLE 7

| Formulation | A | B | C | D |
|---|---|---|---|---|
| 3140 | 80 | 80 | 80 | 80 |
| HS-100 | 20 | 20 | 20 | 20 |
| Melamine | 35 | 35 | 35 | 35 |
| 300 BA | — | — | 5 | 5 |
| TDI 80/20 | 44 | 44 | 44 | 50.15 |
| Index | 106 | 106 | 106 | 106 |
| Q25160 | 1.2 | 1.2 | 1.2 | 1.2 |
| S-50 | 0.8 | 0.725 | 0.725 | 0.75 |
| Water | 3.6 | 3.6 | 3.6 | 4.2 |
| C-232/3140 1:4 | 0.5 | 0.5 | 0.5 | 0.5 |
| DE-60F | 18 | 18 | 15 | 15 |
| Density | 2.14 | 2.18 | 2.19 | 1.83 |
| IFD 4"-25% | 42.5 | 44.5 | 43.5 | 37.0 |
| Air Perm | 0.3 | 1.1 | 1.3 | 1.8 |
| UL-94 Aged Burn Rating | HBF | HBF | HBF | HBF |
| BS-5852 Source 5 | | | | |
| Weight Loss | — | 44 | 43 | 63 |
| Flame Extinguish | — | No | No | Yes |

| Formulation | E | F | G | H |
|---|---|---|---|---|
| 3140 | 80 | 80 | 80 | 80 |
| HS-100 | 20 | 20 | 20 | 20 |
| Melamine | 35 | 35 | 35 | 35 |
| 300 BA | — | — | — | — |
| TDI 80/20 | 44 | 44 | 52.2 | 52.2 |
| Index | 106 | 106 | 106 | 106 |
| Q25160 | 1.2 | 1.2 | 1.2 | 1.2 |
| S-50 | 0.73 | 0.65 | 0.85 | 0.75 |
| Water | 3.6 | 3.6 | 4.4 | 4.4 |
| C-232/3140 1:4 | 0.5 | 0.5 | 0.5 | 0.5 |
| DE-60F | 15 | 15 | 15 | 15 |
| Density | 2.17 | 2.24 | 1.74 | 1.73 |
| IFD 4"-25% | 43.0 | 42.0 | 43.0 | 41.5 |
| Air Perm | 0.7 | 2.0 | 0.4 | 1.5 |
| UL-94 Aged Burn Rating | HF-1 | HBF | HF-1 | HF-1 |
| BS-5852 Source 5 | | | | |
| Weight Loss | — | 24 | — | 61 |
| Flame Extinguish | — | No | — | Yes |

| Formulation | I | J | K |
|---|---|---|---|
| 3140 | 80 | 80 | 80 |
| HS-100 | 20 | 20 | 20 |
| Melamine | 35 | 35 | 35 |
| 300 BA | — | — | 5 |
| TDI 80/20 | 58.3 | 58.3 | 58.3 |
| Index | 106 | 106 | 106 |
| Q25160 | 1.2 | 1.2 | 1.2 |
| S-50 | 0.9 | 0.75 | 0.75 |
| Water | 5 | 5 | 5 |
| C-232/3140 1:4 | 0.5 | 0.5 | 0.5 |
| DE-60F | 15 | 15 | 15 |
| Density | 1.48 | 1.54 | 1.49 |
| IFD 4"-25% | 43.0 | 45.5 | 46.0 |
| Air Perm | 0.6 | 1.8 | 0.6 |
| UL-94 Aged Burn Rating | HF-1 | HBF | HF-1 |
| BS-5852 Source 5 | | | |
| Weight Loss | — | 60 | — |
| Flame Extinguish | — | Yes | — |

TABLE 8

| Formulation | A | B | C |
|---|---|---|---|
| 3140 | 80 | 80 | 80 |
| HS-100 | 20 | 20 | 20 |
| 9151 | — | — | — |
| Melamine | 35 | 35 | 35 |
| TDI 80/20 | 44 | 44 | 52.2 |
| Index | 106 | 106 | 106 |
| Q25160 | 1.2 | 1.2 | 1.2 |
| S-50 | 0.725 | 0.625 | 0.7 |
| Water | 3.6 | 3.6 | 4.4 |
| C-232/3140 1:4 | 0.5 | 0.5 | 0.5 |
| Firemaster 642 | 15 | 15 | 15 |
| DE-60F | — | — | — |
| Density | 2.01 | 2.07 | 1.72 |

TABLE 8-continued

| | | | | |
|---|---|---|---|---|
| IFD 4"-25% | 41.0 | 41.0 | 43.0 | |
| Air Perm | 0.8 | 1.9 | 1.2 | |
| UL-94 Aged | HF-1 | HF-1 | HF-1 | |
| Burn Rating | | | | |
| BS-5852 Source 5 | | | | |
| Weight Loss | — | 73 | — | |
| Flame Extinguish | — | Yes | — | |

| Formulation | D | E | F | G |
|---|---|---|---|---|
| 3140 | 75 | 75 | 75 | 75 |
| HS-100 | — | — | — | — |
| 9151 | 25 | 25 | 25 | 25 |
| Melamine | 35 | 35 | 35 | 35 |
| TDI 80/20 | 43.29 | 43.29 | 51.49 | 57.64 |
| Index | 106 | 106 | 106 | 106 |
| Q25160 | 1.2 | 1.2 | 1.2 | 1.2 |
| S-50 | 0.7 | 0.6 | 0.675 | 0.735 |
| Water | 3.6 | 3.6 | 4.4 | 5 |
| C-232/3140 1:4 | 0.5 | 0.5 | 0.5 | 0.5 |
| Firemaster 642 | — | — | — | — |
| DE-60F | 18 | 18 | 18 | 18 |
| Density | 2.09 | 2.05 | 1.72 | 1.51 |
| IFD 4"-25% | 41.5 | 39.5 | 38.0 | 34.5 |
| Air Perm | 0.7 | 1.7 | 1.1 | 1.2 |
| UL-94 Aged | HF-1 | HF-1 | HF-1 | HF-1 |
| Burn Rating | | | | |
| BS-5852 Source 5 | | | | |
| Weight Loss | — | 37 | — | 30 |
| Flame Extinguish | — | No | — | Yes |

TABLE 9

| Formulation | A | B | C | D |
|---|---|---|---|---|
| 3140 | 100 | 100 | 100 | 100 |
| Melamine | 35 | 35 | 35 | 35 |
| TDI 80/20 | 52.15 | 52.15 | 52.15 | 52.15 |
| Index | 106 | 106 | 106 | 106 |
| Q25160 | 1.2 | 1.2 | 1.2 | 1.2 |
| S-50 | 0.85 | 0.725 | .62 | .62 |
| Water | 4.4 | 4.4 | 4.4 | 4.4 |
| C-232/3140 1:4 | 0.5 | 0.5 | 0.5 | 0.5 |
| DE-60F | 18 | 18 | 18 | — |
| TM-101 | — | — | — | 15 |
| FR-2 | — | — | — | — |
| Density | 1.78 | 1.84 | 1.76 | 1.75 |
| IFD 4"-25% | 38.5 | 37.5 | 36.5 | 37.5 |
| Air Perm | 0.6 | 0.8 | 3.1 | 0.5 |
| UL-94 Aged | | | | |
| Burn Time | 59.4 | 48.8 | 73.8 | 67.2 |
| Burn Distance | 2.19 | 1.71 | 2.91 | 2.39 |
| Burn Rating | HBF | HF-1 | HBF | HBF |
| BS-5852 Source 5 | — | — | Pass | Fail |

| Formulation | E | F | G | H |
|---|---|---|---|---|
| 3140 | 100 | 100 | 100 | 100 |
| Melamine | 35 | 35 | 35 | 35 |
| TDI 80/20 | 52.15 | 45.5 | 45.5 | 45.5 |
| Index | 106 | 106 | 106 | 106 |
| Q25160 | 1.2 | 1.2 | 1.2 | 1.2 |
| S-50 | .62 | .55 | .55 | .50 |
| Water | 4.4 | 3.75 | 3.75 | 3.75 |
| C-232/3140 1:4 | 0.5 | 0.5 | 0.5 | 0.5 |
| DE-60F | — | — | 18 | — |
| TM-101 | — | — | — | 15 |
| FR-2 | 18 | 18 | — | — |
| Density | 1.79 | 2.01 | 2.02 | 2.01 |
| IFD 4"-25% | 36.5 | 35.5 | 38.5 | 37.5 |
| Air Perm | 2.0 | 2.3 | 2.1 | 0.2 |
| UL-94 Aged | | | | |
| Burn Time | 56.6 | 73.8 | 49.4 | 67.4 |
| Burn Distance | 2.14 | 2.61 | 1.64 | 2.40 |
| Burn Rating | HBF | HBF | HF-1 | HBF |
| BS-5852 Source 5 | Fail | Fail | Pass | Fail |

| Formulation | I | J | K | L |
|---|---|---|---|---|
| 3140 | 100 | 100 | 100 | 100 |
| Melamine | 35 | 35 | 35 | 35 |
| TDI 80/20 | 39.35 | 46.89 | 46.89 | 46.89 |
| Index | 106 | 106 | 106 | 106 |
| Q25160 | 1.2 | 1.2 | 1.2 | 1.2 |

TABLE 9-continued

| | | | | |
|---|---|---|---|---|
| S-50 | .425 | .45 | .5 | .5 |
| Water | 3.15 | 3.3 | 3.3 | 3.3 |
| C-232/3140 1:4 | 0.5 | 0.5 | 0.5 | 0.5 |
| DE-60F | — | — | 18 | — |
| TM-101 | 15 | 15 | — | — |
| FR-2 | — | — | — | 18 |
| Density | 2.35 | 2.23 | 2.24 | 2.22 |
| IFD 4"-25% | 37.5 | 36.0 | 37.5 | 36.0 |
| Air Perm | 2.0 | 1.7 | 2.1 | 1.7 |
| UL-94 Aged | | | | |
| Burn Time | 184.2 | 140.8 | 73.2 | 75.6 |
| Burn Distance | 5.85 | 5.26 | 2.69 | 2.36 |
| Burn Rating | NC | NC | HBF | HBF |
| BS-5852 Source 5 | — | Fail | Pass | Fail |

TABLE 10

| Formulation | A | B | C | D |
|---|---|---|---|---|
| 3140 | 100 | 100 | 100 | 100 |
| Melamine | 40 | 40 | 40 | 30 |
| TDI 80/20 | 41.9 | 47 | 53.15 | 39.9 |
| Index | 106 | 106 | 106 | 106 |
| Q25160 | 1.2 | 1.2 | 1.2 | 1.2 |
| S-50 | 0.65 | 0.6 | 0.65 | 0.4 |
| Water | 3.4 | 3.9 | 4.5 | 3.2 |
| C-232/3140 1:4 | 0.5 | 0.5 | 0.5 | 0.5 |
| DE-60F | 18 | 18 | 18 | — |
| TM-101 | — | — | — | 12 |
| Density | 2.25 | 1.96 | 1.71 | 2.21 |
| IFD 4"-25% | 36.5 | 35.5 | 36.5 | 36.0 |
| Air Perm | 1.7 | 2.4 | 1.2 | 1.7 |
| UL-94 Aged | | | | |
| Burn Time | 73.6 | 71.8 | 58.6 | 164.4 |
| Burn Distance | 2.43 | 2.50 | 2.53 | 5.76 |
| Burn Rating | HBF | HBF | HBF | NC |
| BS-5852 Source 5 | Pass | Pass | Pass | — |

| Formulation | E | F | G |
|---|---|---|---|
| 3140 | 100 | 100 | 100 |
| Melamine | 30 | 30 | 30 |
| TDI 80/20 | 46.05 | 43.49 | 43.49 |
| Index | 106 | 106 | 106 |
| Q25160 | 1.2 | 1.2 | 1.2 |
| S-50 | 0.45 | 0.45 | 0.5 |
| Water | 3.8 | 3.55 | 3.55 |
| C-232/3140 1:4 | 0.5 | 0.5 | 0.5 |
| DE-60F | — | — | — |
| TM-101 | 12 | 12 | 12 |
| Density | 1.86 | 1.96 | 1.90 |
| IFD 4"-25% | 34.0 | 32.0 | 30.0 |
| Air Perm | 2.0 | 2.9 | 2.3 |
| UL-94 Aged | | | |
| Burn Time | 129.2 | 140.2 | 139.4 |
| Burn Distance | 5.89 | 5.59 | 6.00 |
| Burn Rating | NC | NC | NC |
| BS-5852 Source 5 | — | — | — |

TABLE 11

| Formulation | A | B | C | D |
|---|---|---|---|---|
| 16-46 | 100 | 100 | 100 | 100 |
| TCI 80/20 | 61.4 | 61.4 | 61.4 | 41.05 |
| Index | 112 | 112 | 112 | 106 |
| Q25160 | 1 | 1 | 1 | 1 |
| T-10 | 0.7 | 0.525 | 0.525 | 0.51 |
| Freon | 6 | 6 | 6 | 2 |
| Water | 4.9 | 4.9 | 4.9 | 3.3 |
| C-232/16-46 1:4 | 0.3 | 0.3 | 0.3 | 0.3 |
| DE-60F | 16 | 16 | 8 | 15 |
| Melamine | 10 | 10 | 10 | 10 |
| E-646 | — | — | — | — |
| Density | 1.14 | 1.22 | 1.05 | 1.81 |
| IFD 4"-25% | 27.0 | 27.5 | 28.0 | 25.0 |
| Air Perm | <0.2 | 2.9 | 0.9 | 3.2 |
| UL-94 Aged | | | | |
| Burn Time | 42.0 | 47.6 | 59.0 | 47.0 |
| Burn Distance | 1.24 | 2.47 | 4.43 | 1.17 |
| Burn Rating | HF-2 | HBF | HBF | HF-2 |

TABLE 11-continued

| Formulation | E | F | G |
|---|---|---|---|
| 16-46 | 100 | 75 | 75 |
| TDI 80/20 | 41.05 | 30.43 | 30.43 |
| Index | 106 | 110 | 110 |
| Q25160 | 1 | 0.8 | 0.8 |
| T-10 | 0.51 | 0.396 | 0.396 |
| Freon | 2 | 2 | 2 |
| Water | 3.3 | 2.2 | 2.2 |
| C-232/16-46 1:4 | 0.3 | 1.6 | 1.6 |
| DE-60F | 7.5 | 12 | 6 |
| Melamine | 10 | 10 | 10 |
| E-646 | — | 25 | 25 |
| Density | 1.80 | 2.30 | 2.18 |
| IFD 4"-25% | 27.0 | 31.5 | 34.5 |
| Air Perm | 3.2 | 2.1 | 2.2 |
| UL-94 Aged | | | |
| Burn Time | 55.6 | 46.4 | 46.0 |
| Burn Distance | 1.74 | 1.44 | 2.00 |
| Burn Rating | HF-2 | HF-2 | HBF |

What is claimed is:

1. An improved ignition resistant, flexible, open-celled polyurethane foam produced in situ from the reaction, in the presence of a catalyst, of an isocyanate, a blowing agent, a foam stabilizer, a polyether polyol, melamine, and a blend of about 80 to 85% pentabromodiphenyl oxide in an aromatic phosphate plasticizer, wherein the melamine is present in an amount of from about 30 to about 40 parts by weight per 100 parts by weight of polyol, and wherein the blend of about 80 to 85% pentabromodiphenyl oxide in an aromatic phosphate plasticizer is present in an amount of from about 15 to about 25 parts by weight per 100 parts by weight of polyol, the polyurethane foam being sufficiently ignition resistant to pass the California Technical Bulletin No. 117, Underwriters Laboratories UL-94, and British Standard 5852 Pt. 2 Source 5 flammability tests.

2. The foam of claim 1 wherein the melamine is present in an amount of about 35 parts by weight per 100 parts by weight of polyol.

3. The foam of claim 2 wherein the blend of about 80 to 85% pentabroomodiphenyl oxide in an aromatic phosphate plasticizer is present in an amount of about 18 parts by weight per 100 parts by weight of polyol.

4. The foam of claim 3 wherein the isocyanate is tolylene diisocyanate.

5. In the method for the continuous manufacture of ignition resistant, flexible, open-celled polyurethane foam from the reaction, in the presence of a catalyst, of a formulation comprising an isocyanate, a blowing agent, a foam stabilizer, and a polyether polyol, the improvement which comprises:

adding to the formulation melamine and a blend of about 80 to 85% pentabromodiphenyl oxide in an aromatic phosphate plasticizer, wherein the melamine is added to the formulation in an amount of from about 30 to about 40 parts by weight per 100 parts by weight of polyol, and wherein the blend of about 80 to 85% pentabromodiphenyl oxide in an aromatic phosphate plasticizer is added to the formulation in an amount of from about 15 to about 25 parts by weight per 100 parts by weight of polyol, the polyurethane foam being sufficiently ignition resistant to pass the California Technical Bulletin No. 117, Underwriters Laboratories UL-94, and British Standard 5852 Pt. 2 Source 5 flammability tests.

6. The method of claim 5 wherein the melamine is added in an amount of about 35 parts by weight per 100 parts by weight of polyol.

7. The method of claim 6 wherein the blend of about 80 to 85% pentabromodiphenyl oxide in an aromatic phosphate plasticizer is added in an amount of about 18 parts by weight per 100 parts by weight of polyol.

8. The method of claim 7 wherein the isocyanate is tolylene diisocyanate.

9. The foam of claim 1 which has a density within the range of from about 1.4 to about 2.4 pounds per cubic foot.

10. The foam of claim 1 which is a conventional, non-high-resilient foam.

* * * * *